United States Patent Office 3,641,214
Patented Feb. 8, 1972

3,641,214
METHOD OF STABILIZING POLYETHYLENE WITH ANION EXCHANGE RESINS
Cesare Reni, Milan, Italy, assignor to Societá Italiana Resine S.p.A., Milan, Italy
No Drawing. Continuation-in-part of application Ser. No. 563,377, July 7, 1966. This application Feb. 28, 1969, Ser. No. 803,435
Claims priority, application Italy, July 10, 1965, 15,564/65
Int. Cl. C08f 29/12
U.S. Cl. 260—897 B
8 Claims

ABSTRACT OF THE DISCLOSURE

An oxygen stable polyethylene comprising:
(a) polyethylene, and
(b) from 0.01 to 0.5% by weight, based on the polyethylene employed, of an anion exchanger selected from the group consisting of mono-vinyl aromatic/divinyl aromatic copolymers and liquid amine resins, said copolymers having substituted thereon, a group of the formula:

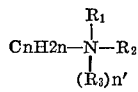

wherein $R_1$, $R_2$ and $R_3$ are members selected from the group consisting of alkyl and alkylol groups of from 1 to 4 carbon atoms, said $n$ being an integer of from 1 to 4 and said $n'$ being 0 to 1, and said liquid amine resins being N-dodecenyl (trialkyl methyl) amines of a molecular weight ranging from 351 to 393.

---

The present application is a continuation-in-part application of Ser. No. 563,377, filed July 7, 1966, now abandoned, which application claimed the right of priority, based on Italian application Ser. No. 15,564/65, filed July 10, 1965.

BACKGROUND OF THE INVENTION

Field of the invention

The present invention relates to oxygen stabilized polyethylene and to a process for its production. Particularly, the present invention is directed to the use of polymers such as polystyrenes having ionic amine groups therein.

Description of the prior art

It is known that ethylene polymers are easily oxidized by the action of atmospheric oxygen, particularly during hot molding processes. When this happens the polymer absorbs a certain quantity of oxygen which adversely affects its mechanical and electrical properties. Ultraviolet rays, in addition to heat, catalyze the absorption of oxygen so that articles exposed to sunlight over the course of a few months rapidly lose their peculiar characteristics even at room temperature.

In order to avoid such decay processes it is known to admix ethylene polymers and polyolefins, generally, with special substances, or combinations of substances, which are adapted to prevent absorption of atmospheric oxygen by the polymer, thus causing the latter, at the same time, to maintain its properties over lengthy periods.

These substances should meet certain fundamental requirements. In particular, they should be effective at extremely low concentrations, and should not alter the fundamental properties of the polymer to which they are added. Particular attention should be given to the electrical properties which are most sensitive to the presence of foreign substances. A further fundamental property of these stabilizers should be to avoid coloring the product.

SUMMARY OF THE INVENTION

It has now been found that ion exchange resins, either anionic or cationic meet the above-described requirements in that they are effective in small quantities and do not alter the properties of the polymer to which they are added.

Therefore according to the invention we provide an oxygen stable polyethylene composition comprising ethylene and a stabilizing quantity of an ion exchange resin. The ion exchange resin used can be solid and insoluble in organic solvents, or liquid and soluble therein.

The structure of these resins is rather complex as the inert portion of these products is obtained by polycondensation or polymerization of various substances, for example, aromatic or aliphatic polyolefins with phenols and/or aldehydes, or styrol with divinylbenzol. The effective portion of these, that is the ion exchange groups, comprises quaternary ammonium, quaternary phosphonium, tertiary sulfonium, carboxyl groups, etc.

DESCRIPTION OF THE INVENTION

It has been found that ion exchange resins yielding the best results are those having an alkaline nature, i.e. anion exchange resins. These substances are effective antioxidants when they are added to polymers in very low percentages. The stabilizing effect is apparent when the ion exchange resin is used in a quantity of from 0.01% by weight up to 0.5% by weight of the polymer can be used. The optimum quantities range between 0.05% and 0.01% by weight of the polymer.

The anion exchange resins of the present invention are disclosed in, for example, U.S. Pats. 2,591,573, to McBurney, 2,614,099, to Bauman et al. and 2,955,019, to Dickert et al., herein incorporated by reference.

The anion exchange resins typically fall into three groups, as follows:
(1) resins containing a copolymer of mono and divinyl compounds as the backbone,
(2) polycondensation resins, and
(3) liquid amine resins.

The first group, containing vinyl hydrocarbon polymers, disclosed in U.S. Pats. 2,591,573 to McBurney and 2,614,099 to Bauman et al. usually has a predominant amount, on a molar basis, of a mono-vinyl hydrocarbon. That is, more than half of the total number of mols of hydrocarbon employed are those of the mono-vinyl hydrocarbon. It is preferred that the mono-vinyl hydrocarbon constitute from 60 to 99.9%, on a molar basis, of the mixture of vinyl hydrocarbons. Thus, the preferable amount of divinyl hydrocarbons is from 0.1 to 40% on a molar basis. The latter is a cross-linking agent which imparts insolubility and complexity to the copolymer. The resin products are insoluble quaternary and tertiary ammonium compositions which contain an insoluble cross-linking copolymer of a mixture of the above aromatic mono-vinyl hydrocarbons and aromatic divinyl hydrocarbons, and contain a substituent having the following general formula:

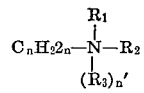

where $R_1$, $R_2$ and $R_3$ are alkyl or alkylol groups containing from 1 to 4 carbon atoms, said $n$ being an integer ranging from 1 to 4, and said $n'$ being 0 or 1. That is, the copolymers contain a nitrogen atom which forms either tertiary or quaternary amine compounds, and the amines thus formed may be either alkyl or alkylol amines. The preferred form of the present resins would be a copolymer of styrene and a divinylbenzene having bonded thereto dimethyl (hydroxyethyl) amines.

The polycondensation products are insoluble resinous compositions obtained by the condensation of formaldehyde with a compound selected from the group consisting of m-phenylene diamine, analine, and polyethylene amine. Typical examples of these compounds are Imac S-3 and Duolite A-5.

The liquid amine resins of the present invention are not true polymers, but are considered as both liquid anion exchangers and as resins. Typical exemplary liquid resins are N-dodecenyl (trialkylmethyl) amines having a molecular weight of from about 351 to 393. A typical resin is Amberlite LA-1.

The above anion exchange resins are, as can be seen, nitrogen containing compounds, and function as antioxidants in the present invention. These anion exchange resins are typical of the types which may be used.

Surprisingly it has also been found that the combination of ion exchange resins with conventional antioxidants of the bisphenol type causes a synergistic effect, i.e. when a combination of ion exchange resin and bisphenol is used as a stabilizer, the stabilizing effect is greater than would have been expected from the sum of the stabilizing effects of each independently. Obviously, if desired, an anion exchange resin, and a plurality of bisphenol antioxidants or vice-versa can be combined together, or any other possible combination can be used.

When the polymer is admixed with anion exchange resin and bisphenol antoxidant mixture the relative proportions of them may range within wide limits and depend on the type of bisphenol and resin used and their effectiveness. However good synergistic effects are usually achieved by resin/bisphenol ratios from 1:10 to 10:1. Bisphenols having at least two alkyl substituents in each phenol group, preferably in the 2,4-positions, are particularly useful.

The stabilizing compounds are added to the polymer so as to obtain a thorough mixture. This dispersion can be obtained by various methods, such as the use of a solvent which dissolves the polymer, and ion exchange resin (if the latter be soluble) and, possibly, also the phenol compound, followed by evaporation of the solvent; or melting of the polyethylene and admixture therewith of the stabilizer or stabilizer mixture while stirring; or feeding, by a metering pump, of a solution of the stabilizers directly to the extrusion die. The manner of effecting the addition is, however, not important in obtaining the effects described herein.

The following examples further illustrate the invention.

EXAMPLES 1–12

The procedure for evaluating the antioxidant effectiveness of the substances added to polyethylene which was employed is as follows: 100 g. polymer were melted in a 200 cc. tall glass beaker open to the atmosphere in a thermostatically controlled bath at 230° C., while stirring the melt by means of a stirrer. When the mass was fully liquified, the stabilizer or mixture in the desired quantity was added and dispersed in the melt for a few seconds. The beaker was then kept in the bath at 230° C. for five hours, constantly in the presence of air and while stirring the melt. At the end of this period the beaker contents were cooled and converted to thin plates of 1.3 mm. thickness by means of a small laboratory press. The plates were cut to obtain test specimens of suitable size to be in accordance with the ASTM D–1531/58 T test for determining the dissipation factor and dielectric constant at the frequency of 2 kc./sec.

The dissipation factor of polyethylene is responsive to an increase in the deterioration of the polyethylene due to the action of atmospheric oxygen. Thus, by determining the dissipation factor, the stabilizing activity of various resins can be compared.

The polyethylene employed throughout the tests was the high pressure type of a density of 0.923 g./cc. and a viscosity index in the melted state of (ASTM D–1238/57 T).

The following table summarizes the values obtained by the tests of Examples 1–12.

| Test | Type of resin | Quantity of resin, percent by weight on polymer | Heating, hrs. at 230° C. | Dissipation factor at 2 kc./s. |
|---|---|---|---|---|
| 1 | None | | 0 | 0.0008 |
| 2 | do | | 5 | 0.0015 |
| 3 | Amberlite LA-1 [a] | 0.01 | 5 | 0.0008 |
| 4 | do.[a] | 0.05 | 5 | 0.0005 |
| 5 | do.[a] | 0.10 | 5 | 0.0004 |
| 6 | Imac S-3 [b] | 0.01 | 5 | 0.0009 |
| 7 | do.[b] | 0.05 | 5 | 0.0006 |
| 8 | do.[b] | 0.10 | 5 | 0.0005 |
| 9 | Duolite A30-T [c] | 0.01 | 5 | 0.0010 |
| 10 | do.[c] | 0.05 | 5 | 0.0006 |
| 11 | do.[c] | 0.10 | 5 | 0.0004 |
| 12 | Dowex 2 [d] | 0.08 | 5 | 0.0008 |

[a] Amberlite LA-1 is a N-dodecenyl (trialkylmethyl) amine of a molecular weight of from 351 to 393.
[b] Imac S-3 is a condensation polymer containing quarternary ammonium groups.
[c] Duolite A30-T is a epoxy polyamine resin having tertiary amino groups.
[d] Dowex 2 is a polystyrene resin containing N(alkylol)(alkyl)$_2$ groups.

This set of tests utilized the anionic exchange resin only.

EXAMPLES 13–18

This second set of tests utilized the bisphenol antioxidant only. All the conditions were as in the first set of examples.

| Test | Type of phenol | Phenol quantity, percent by weight on polymer | Heating, hrs. at 230° C. | Dissipation factor at 2 kc./s. |
|---|---|---|---|---|
| 13 | 2,2′-methylene-bis(4-methyl, 6-tert-butyl-phenol). | 0.01 | 5 | 0.0010 |
| 14 | do | 0.05 | 5 | 0.0007 |
| 15 | 2,2′-isopropylene-bis (4,6-dibutylphenol). | 0.01 | 5 | 0.0006 |
| 16 | do | 0.05 | 5 | 0.0004 |
| 17 | 2,2′-methylene-bis(4-methyl-6-butyl-phenol). | 0.01 | 5 | 0.0006 |
| 18 | do | 0.05 | 5 | 0.0004 |

EXAMPLES 18–21

All the conditions were as in the first set of examples. This set of tests utilized mixtures of ion exchange resins and 2,2′-isopropylene-bis-(4,6-dibutyl phenol). The latter was always present in an amount of 0.01% by weight on the polymer.

| Test | Type of resin | Quantity of resin, percent by weight on polymer | Heating, hrs. at 230° C. | Dissipation factor at 2 kc./s. |
|---|---|---|---|---|
| 18 | Amberlite LA-1 | 0.05 | 5 | 0.0003 |
| 19 | do | 0.10 | 5 | 0.0002 |
| 20 | Dowex 2 | 0.05 | 5 | 0.0004 |
| 21 | Amberlite IRA 402 [a] | 0.01 | 5 | 0.0003 |

[a] Amberlite IRA 402 is a polystyrene resin containing -N(alkyl)$_3^+$ groups.

EXAMPLES 22–25

All the conditions were as in the first set of examples. This set utilized mixtures of ion exchange resins and 2,2′-methylene-bis-(4-methyl-6-butyl phenol). This latter was always in a quantity of 0.05% on the polymer.

| Test | Type of resin | Resin quantity, percent by weight on polymer | Heating, hrs. at 230° C. | Dissipation factor at 2 kc./s. |
|---|---|---|---|---|
| 22 | Duolite A-5 [a] | 0.01 | 5 | 0.0002 |
| 23 | Lewatit MP-60 [b] | 0.05 | 5 | 0.0004 |
| 24 | Amberlite LA-1 | 0.01 | 5 | 0.0002 |
| 25 | Duolite A-30-T | 0.01 | 5 | 0.0003 |

[a] Duolite A-5 is a condensation polymer containing weak base amino groups.
[b] Lewatit MP-60 is a polystyrene resin containing tertiary amino groups.

wherein $R_1$, $R_2$ and $R_3$ are members selected from the group consisting of alkyl and alkylol groups of from 1 to 4 carbon atoms, said $n$ being an integer of from 1 to 4 and said $n'$ being 0 or 1, and said liquid amine resins being N-dodecenyl (trialkyl methyl) amines of a molecular weight ranging from 351 to 393.

I claim:
1. An oxygen stable polyethylene comprising:
   (a) polyethylene and
   (b) from 0.01 to 0.5% by weight, based on the polyethylene employed, of an anion exchanger selected from the group consisting of mono-vinyl aromatic/di-vinyl aromatic copolymers and liquid amines resins, said copolymers having substituted thereon, a group of the formula:

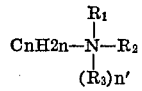

wherein $R_1$, $R_2$ and $R_3$ are members selected from the group consisting of alkyl and alkylol groups of from 1 to 4 carbon atoms, said $n$ being an integer of from 1 to 4 and said $n'$ being 0 to 1, and said liquid amine resins being N-dodecenyl (trialkyl methyl) amines of a molecular weight ranging from 351 to 393.

2. The process for producing an oxygen stable polyethylene comprising the steps of:
   (a) incorporating into the polyethylene, from 0.01 to 0.5% by weight, based on the polyethylene, of an anion exchanger selected from the group consisting of mono-vinyl aromatic/di-vinyl aromatic copolymers and liquid amine resins, said copolymers having substituted thereon, a group of the formula:

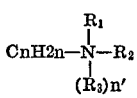

wherein $R_1$, $R_2$ and $R_3$ are members selected from the group consisting of alkyl and alkylol groups of from 1 to 4 carbon atoms, said $n$ being an integer of from 1 to 4 and said $n'$ being 0 or 1, and said liquid amine resins being N-dodecenyl (trialkyl methyl) amines of a molecular weight ranging from 351 to 393.

3. The oxygen stable polyethylene of claim 1 wherein the anion exchanger is a copolymer of from 60 to 99.9% styrene and from 0.1 to 40% of an aromatic divinyl compound, and wherein $R_1$ and $R_2$ are methyl, $R_3$ is hydroxyethyl, and N is 1.

4. The oxygen stable polyethylene of claim 1 wherein the anion exchanger is present in an amount of between 0.05 and 0.10% by weight of the polyethylene.

5. The oxygen stable polyethylene of claim 1 wherein there is additionally present a bisphenol, and the ratio of anion exchanger to bisphenol is between 1:10 and 10:1, on a weight basis.

6. The process of claim 2 wherein the anion exchanger is a copolymer of from 60 to 99.9% styrene and from 0.1 to 40% of an aromatic divinyl compound, and wherein $R_1$ and $R_2$ are methyl, $R_3$ is hydroxyethyl, and N is 1.

7. The process of claim 2 wherein the anion exchanger is present in an amount of between 0.05 and 0.10% by weight of the polyethylene.

8. The process of claim 2 wherein there is additionally present a bisphenol, and the ratio of anion exchanger to bisphenol is between 1:10 and 10:1, on a weight basis.

References Cited

UNITED STATES PATENTS

| | | | |
|---|---|---|---|
| 3,335,124 | 8/1967 | Larsen | 260—94.9 |
| 3,230,029 | 1/1966 | Cappuccio et al. | 8—55 |
| 2,829,121 | 4/1958 | Leeper | 260—45.9 |
| 2,929,797 | 3/1960 | Albert | 260—45.9 |
| 2,681,319 | 6/1954 | Bodamer | 260—2.1 |

FOREIGN PATENTS

| | | | |
|---|---|---|---|
| 575,808 | 5/1959 | Canada | 260—45.9 |

MURRAY TILLMAN, Primary Examiner

C. SECCURO, Assistant Examiner

U.S. Cl. X.R.

260—2.1 E, 45.9 R, 45.95, 854, 897 R